United States Patent
Liu et al.

(10) Patent No.: US 12,414,094 B2
(45) Date of Patent: Sep. 9, 2025

(54) METHOD AND APPARATUS FOR SLOT FORMAT INDICATION IN NTN SYSTEM

(71) Applicant: Lenovo (Beijing) Ltd., Beijing (CN)

(72) Inventors: Hongmei Liu, Changping District (CN); Zhi Yan, Xicheng District (CN); Yuantao Zhang, Dongcheng District (CN); Bingchao Liu, Changping District (CN); Haiming Wang, Xicheng District (CN)

(73) Assignee: Lenovo (Beijing) Limited, Beijing (CN)

( * ) Notice: Subject to any disclaimer, the term of this patent is extended or adjusted under 35 U.S.C. 154(b) by 417 days.

(21) Appl. No.: 17/999,484

(22) PCT Filed: Jun. 2, 2020

(86) PCT No.: PCT/CN2020/094004
§ 371 (c)(1),
(2) Date: Nov. 21, 2022

(87) PCT Pub. No.: WO2021/243579
PCT Pub. Date: Dec. 9, 2021

(65) Prior Publication Data
US 2023/0199729 A1    Jun. 22, 2023

(51) Int. Cl.
*H04W 72/04* (2023.01)
*H04W 72/0446* (2023.01)
*H04W 72/232* (2023.01)

(52) U.S. Cl.
CPC ..... *H04W 72/0446* (2013.01); *H04W 72/232* (2023.01)

(58) Field of Classification Search
CPC .............................. H04L 12/28; H04L 12/50
USPC ........................... 370/329, 401, 405
See application file for complete search history.

(56) References Cited

U.S. PATENT DOCUMENTS 12,075,490 B2 * 8/2024 Khoshkholgh Dashtaki ............... H04W 74/0833
2019/0268923 A1   8/2019 Sundararajan et al.

FOREIGN PATENT DOCUMENTS

| CN | 108809614 A | 11/2018 |
|---|---|---|
| CN | 109644461 A | 4/2019 |

OTHER PUBLICATIONS

"Technical Specification Group Radio Access Network", 3GPP TS 38.213 V16.1.0, 3rd Generation Partnership Project [retrieved Nov. 2, 2022]. Retrieved from the Internet <https://portal.3gpp.org/desktopmodules/Specifications/SpecificationDetails.aspx?specificationId=3215>., Mar. 2020, 156 pages.

PCT/CN2020/094004 , "International Preliminary Report on Patentability", PCT Application No. PCT/CN2020/094004, Dec. 15, 2022, 6 pages.

(Continued)

*Primary Examiner* — Dang T Ton
(74) *Attorney, Agent, or Firm* — FIG. 1 Patents

(57) ABSTRACT

The present application relates to method and apparatus for slot format indication in Non-terrestrial networks (NTN) system. A method performed by a user equipment (UE) is disclosed, wherein the method comprises: receiving information indicating one or more slot formats, wherein each slot format comprises a plurality of symbols each indicated as a downlink symbol, a uplink symbol or a flexible symbol; and performing transmission or reception based on the one or more slot formats.

21 Claims, 11 Drawing Sheets

(56) References Cited

OTHER PUBLICATIONS

PCT/CN2020/094004 , "International Search Report and Written Opinion", PCT Application No. PCT/CN2020/094004, Mar. 1, 2021, 7 pages.
ZTE , "Discussion on the enhancement of NTN", 3GPP TSG RAN WG1 #101, R1-2003560, e-Meeting [retrieved Nov. 2, 2022]. Retrieved from the Internet <https://www.3gpp.org/ftp/TSG_RAN/WG1_RL1/TSGR1_101-e/Docs/>., Jun. 2020, 6 Pages.

* cited by examiner

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |

FIG. 3A

| 30 | D | D | D | D | D | D | D | D | D | D | F | F | F | U |
| --- | --- | --- | --- | --- | --- | --- | --- | --- | --- | --- | --- | --- | --- | --- |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56 – 254 | Reserved | | | | | | | | | | | | | |
| 255 | UE determines the slot format for the slot based on *tdd-UL-DL-ConfigurationCommon*, or *tdd-UL-DL-ConfigurationDedicated* and, if any, on detected DCI formats | | | | | | | | | | | | | |

FIG. 3B

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 15 | F | F | F | F | F | F | U | U | U | U | U | U | U | U |
| 15A | F | F | F | F | F | U | U | U | U | U | U | U | U | F |
| 15B | F | F | F | F | U | U | U | U | U | U | U | U | F | F |
| 15C | F | F | F | U | U | U | U | U | U | U | U | F | F | F |
| 15D | F | F | U | U | U | U | U | U | U | U | F | F | F | F |
| 15E | F | U | U | U | U | U | U | U | U | F | F | F | F | F |

FIG. 4

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 52 | D | F | F | F | F | F | U | D | F | F | F | F | F | U |
| 52A | D | F | F | F | U | F | D | F | F | F | F | U | F |
| 52B | D | F | F | U | F | F | D | F | F | F | U | F | F |
| 52C | D | F | U | F | F | F | D | F | F | U | F | F | F |
| 52D | D | F | U | F | F | F | F | D | F | U | F | F | F | F |

METHOD AND APPARATUS FOR SLOT FORMAT INDICATION IN NTN SYSTEM

TECHNICAL FIELD

The present disclosure generally relates to wireless communications, and more particularly, to slot format indication in Non-terrestrial networks (NTN) system.

BACKGROUND

The wireless communications network has grown rapidly over the years. The next generation wireless communication system 5G is an example of an emerging telecommunication standard. 5G, or new radio (NR) networks are expected to increase throughput, coverage, and robustness and reduce latency and operational and capital expenditures. In general, NR is a set of enhancements to the Long Term Evolution (LTE) mobile standard promulgated by the 3rd Generation Partnership Project (3GPP). In order to provide seamless coverage for terminal equipment, in places such as sea, desert, air where base stations cannot be deployed, 5G networks introduced NTN system. NTN system provides seamless coverage for terminal equipment by deploying network devices in satellites.

In contrast to the terrestrial networks where all communication nodes (e.g., base stations) are located on the earth, the NTN network incorporating satellites and/or airborne vehicles to perform some or all of the functions of terrestrial base stations. There are still a variety of issues regarding NTN network that need to be addressed.

SUMMARY

One aspect of the present disclosure provides a method performed by user equipment (UE), the method comprises: receiving information indicating one or more slot formats, wherein each slot format comprises a plurality of symbols each indicated as a downlink (DL) symbol, a uplink (UL) symbol or a flexible symbol; and performing transmission or reception based on the one or more slot formats.

Another aspect of the present disclosure provides a method performed by a base station (BS), the method comprises: sending information indicating one or more slot formats, wherein each slot format comprises a plurality of symbols each indicated as a downlink symbol, a uplink symbol or a flexible symbol.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIGS. 3A and 3B illustrates a table of legacy slot formats for normal CP in TS 38.213.

FIG. 4 illustrates new slot formats in accordance with some embodiments of the present disclosure.

FIG. 5 illustrates new slot formats in accordance with some embodiments of the present disclosure.

DETAILED DESCRIPTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present disclosure are also applicable to similar technical problems; and moreover, the terminologies recited in the present disclosure may change, which should not affect the principle of the present disclosure.

Figure 1:
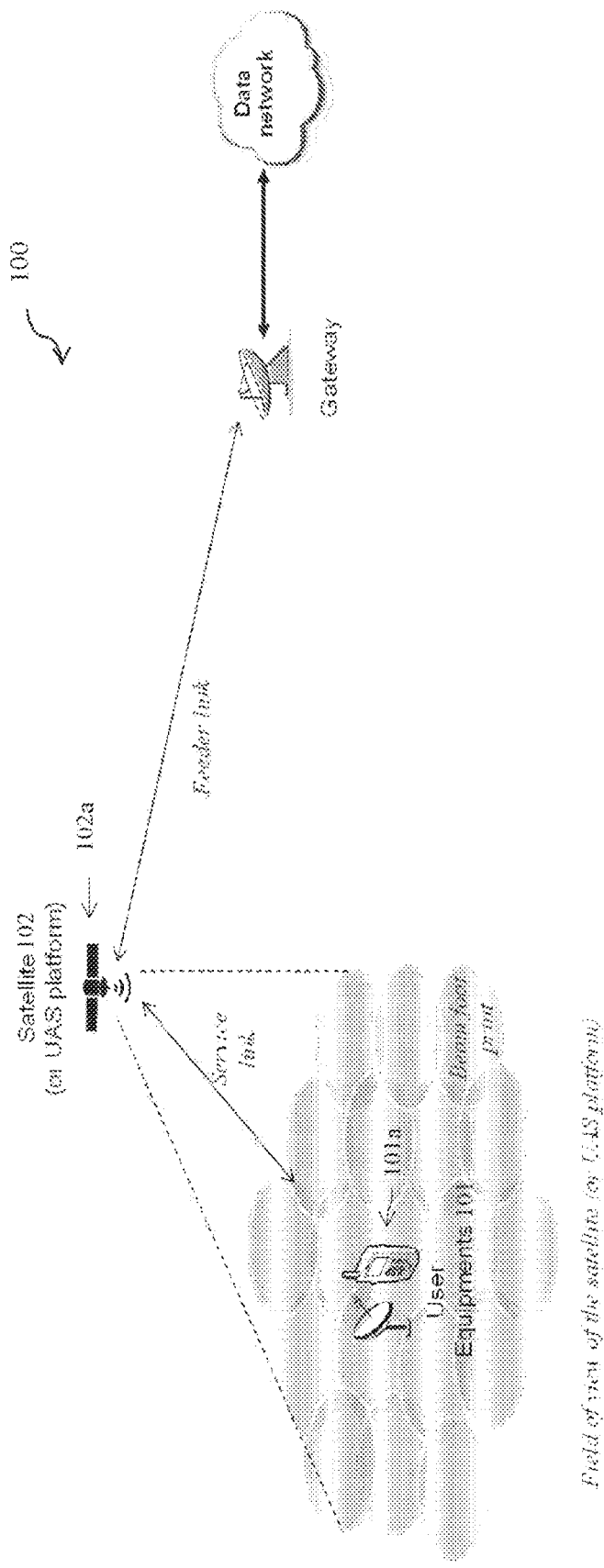
FIG. 1 illustrates an exemplary NTN network in which techniques disclosed herein may be implemented, in accordance with some embodiments of the present disclosure.

FIG. 1 illustrates an exemplary NTN network 100 in which the techniques, processes and methods described herein can be implemented, in accordance with various embodiments. As shown in FIG. 1, the NTN network 100 includes at least one user equipment (UE) 101 and at least one satellite 102, or alternatively a UAS platform 102. Although only one UE 101a and a satellite/UAS platform 102a are depicted in FIG. 1, it is contemplated that any number of UEs 101 and satellites/UAS platforms 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

Satellite(s) 102 may include Low Earth Orbiting (LEO) satellites, Medium Earth Orbiting (MEO) satellites, Geostationary Earth Orbiting (GEO) satellites, as well as Highly Elliptical Orbiting (HEO) satellites. UAS platform(s) 102 may include Unmanned Aircraft Systems (UAS) including tethered UAS and Lighter than Air UAS (LTA), Heavier than Air UAS (HTA), and High Altitude Platforms UAS (HAPs). For convenience, we will use satellite(s) hereinafter to elaborate the present invention. However, persons skilled in the art can know that the same technique may also be applied to UAS platform(s).

Referring still to FIG. 1, the satellite 102 provides a plurality of geographic cells for serving UEs 101 located in one or more of the geographic cells. In FIG. 1, example UEs may be a normal mobile terminal 101a, which can wirelessly communicate with the satellite/UAS platform 102 via a communications link, such as service link or radio link in accordance with a NR access technology (e.g., a NR-Uu interface). As also shown in FIG. 1, the satellite 102 also communicates with a gateway or earth station via a communication link, which may be a feeder link or radio link in accordance with NR access technologies or other technologies. In accordance with various embodiments, the satellite 102 may be implemented with either a transparent or a regenerative payload. When the satellite carries a "transparent" payload, it performs only radio frequency filtering, frequency conversion and/or amplification of signals on board. Hence, the waveform signal repeated by the payload is un-changed. When a satellite carries a regenerative payload, in addition to performing radio frequency filtering, frequency conversion and amplification, it performs other signal processing functions such as demodulation/decoding, switching and/or routing, coding/decoding and modulation/demodulation on board as well. In other words, for a satellite with a regenerative payload (re, all or part of base station functions (e.g., a gNB, eNB, etc.) are implemented on board.

A typical terrestrial communication network includes one or more base stations (typically known as a "BS") that are located on earth (i.e., not airborne or spaceborne) that each provides geographical radio coverage, and UEs that can transmit and receive data within the radio coverage. In the terrestrial communication network, a BS and a UE can communicate with each other via a communication link, e.g., via a downlink radio frame from the BS to the UE or via an uplink radio frame from the UE to the BS. In some embodiments, the present disclosure provides systems and methods for replacing one or more terrestrial BSs with one or more satellites to provide a non-terrestrial network.

Returning back to FIG. 1, the gateway may be coupled to a data network such as, for example, the Internet, terrestrial public switched telephone network, mobile telephone network, or a private server network, etc. Gateway and the satellite 102 communicate over a feeder link, which has both a feeder uplink from the gateway to the satellite 102 and a feeder downlink from the satellite 102 to the gateway. Although a single gateway is shown, some implementations will include many gateways, such as five, ten, or more. One embodiment includes only one gateway. UE 101 and satellite 102 communicate over service link, which has both an uplink from the UE 101 to the satellite 102 and a downlink from the satellite 102 to the UE 101.

In some embodiments, communication within the system of FIG. 1 follows a nominal roundtrip direction whereby data is received by gateway from data network (e.g., the Internet) and transmitted over a forward path to a set of UE 101. In one example, communication over the forward path comprises transmitting the data from gateway to satellite 102 via uplink of the feeder link, through a first signal path on satellite, and from satellite 102 to UE(s) 101 via downlink of the service link. Data can also be sent from the UEs 101 over a return path to gateway. In one example, communication over the return path comprises transmitting the data from a UE (e.g., UE101a) to satellite 102 via uplink of the service link, through a second signal path on satellite 102, and from satellite 102 to gateway via downlink of the feeder link.

In NTN network, large propagation delay exits due to high altitude of the satellite. Large full TA value is used for UL synchronization between BS and UE, and legacy slot format indication can work for full TA case. Nevertheless, it is hard to precisely indicate the time delay between satellite and ground station when the satellite is moving fast. Thus, full TA is less desirable for communication with Low Earth Orbit (LEO). On the other hand, partial TA can decrease the signalling overhead for TA command and does not require precise time delay between satellite and ground station.

When UE transmits a Reference Signal (RS)/channel in a UL symbol with partial TA, the time instance for BS's reception of the UL signal will be delayed compared to the full TA case. For the last UL symbol in a slot, the reception time instance will be in the next slot, which is not desirable for multi-UE multiplexing between different slots. Thus, some symbols in the ending of the slot should be indicated as F to avoid UL transmission.

Figure 2:
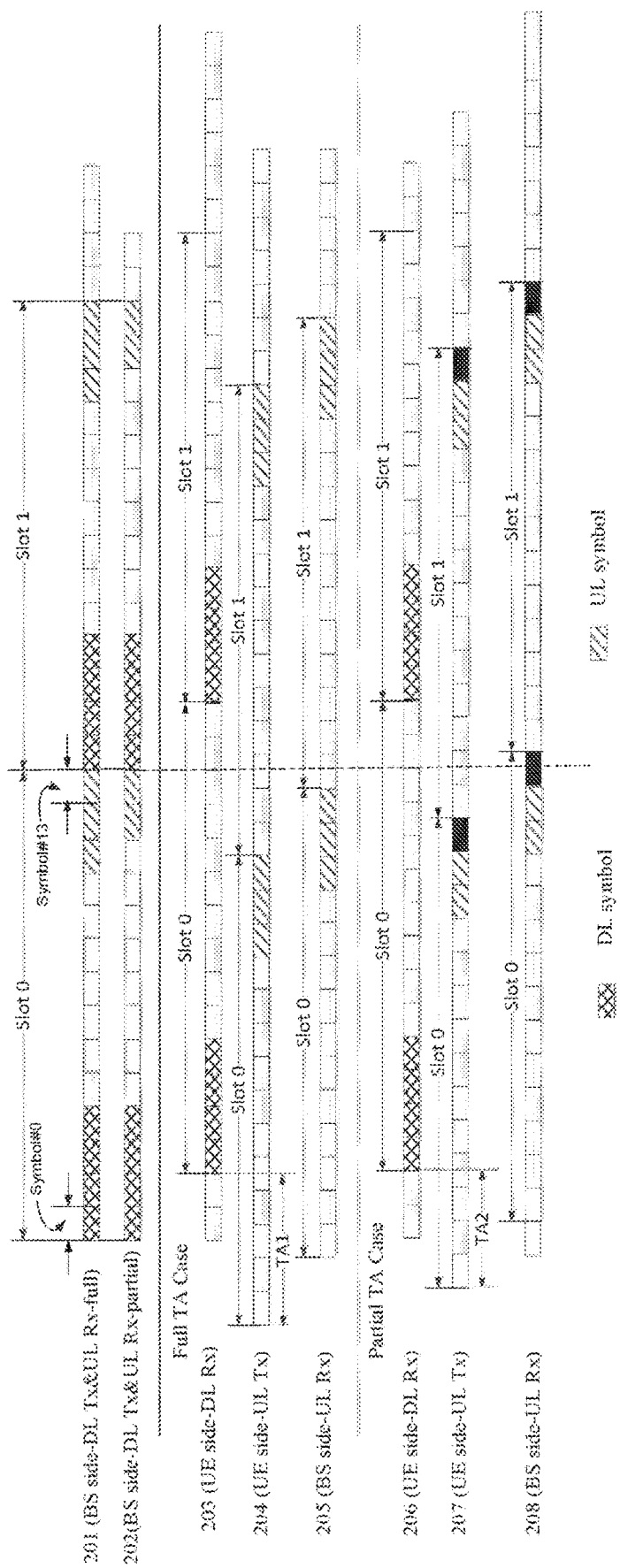
FIG. 2 illustrates an example of the propagation delay between base station and user equipment when partial Time Advancing (TA) and full TA are applied.

FIG. 2 illustrates an example of the propagation delay between BS and UE when partial TA scheme and full TA are applied. In this example, the propagation delay between BS and UE is 2 symbols. Wherein, 201 indicates DL signal transmitted to UE and UL signal received from UE at the BS side for full TA case, and 202 indicates DL signal transmitted to UE and UL signal received from UE at the BS side for partial TA case.

For full TA case (203-205), the indicated TA1 value is 4.5 symbols with 0.5 symbol UL-to-DL transition delay. Wherein:

203 indicates DL signal received from the BS at the UE side, for example, at symbols #0-#3 of slot 0.

204 indicates UL signal transmitted to the BS at the UE side, for example, at symbols #11-#13 of slot 0.

205 indicates UL signal received from the UE at the BS side, for example, at symbols #11-#13 of slot 0.

It can be seen that DL signal received at the UE side (203) includes 2-symbols propagation delay compared with DL signal transmitted at the BS side (201), and UL signal received at the BS side (205) includes 2-symbols propagation delay compared with UL signal transmitted at the UE side (203). It can also be seen that UL signal transmitted at the UE side (204) is 4.5 symbols (TA1) in advance of the DL signal received at the UE side (203).

For partial TA case (206-208), the indicated TA2 value is 3.5 symbols. Wherein:

206 indicates DL signal received from the BS at the UE side, for example, at symbols #0-#3 of slot 0.

207 indicates UL signal transmitted to the BS at the UE side, for example, at symbols #11-#13 of slot 0.

208 indicates UL signal received from the UE at the BS side, for example, at symbols #11-#13 of slot 0.

It can be seen that DL signal received at the UE side (206) includes 2-symbols propagation delay compared with DL signal transmitted at the BS side (202), and UL signal received at the BS side (208) includes 2-symbols propagation delay compared with UL signal transmitted at the UE side (207). It can also be seen that the UL signal transmitted at the UE side (207) is 3.5 symbols (TA2) in advance of the UL signal received at the UE side (206).

As shown in FIG. 2, for partial TA case, UL signal transmitted in symbol #13 in slot 0 (the blocks in black in FIG. 2) will fall into symbol #0 of slot 1 at the BS side. Thus, the last UL symbol is not available.

Regarding slot format configuration in NR R15/R16, there are semi-static slot format configuration and dynamic slot format configuration.

Regarding semi-static TDD configuration, the tdd-UL-DL-ConfigurationCommon provides a reference SCS configuration $\mu_{ref}$ by referenceSubcarrierSpacing and a pattern1. The pattern1 provides a slot configuration period of P msec by dl-UL-TransmissionPeriodicity, a number of slots $d_{slots}$ with only downlink symbols by nrofDownlinkSlots, a number of downlink symbols $d_{sym}$ by nrofDownlinkSymbols, a number of slots $\mu_{slots}$ with only uplink symbols by nrofUplinkSlots, and a number of uplink symbols $\mu_{sym}$, by nrofUplinkSymbols.

A value P=0.625 msec is valid only for $\mu_{ref}$=3. A value P=1.25 msec is valid only for $\mu_{ref}$=2 or $\mu_{ref}$=3. A value P=2.5 msec is valid only for $\mu_{ref}$=1, or $\mu_{ref}$=2, or $\mu_{ref}$=3.

A slot configuration period of P msec includes S=P·$2^{\mu_{ref}}$ slots with SCS configuration $\mu_{ref}$. From the S slots, a first $d_{slots}$ slots include only downlink symbols and a last $\mu_{slots}$ slots include only uplink symbols. The $d_{sym}$ symbols after the first $d_{slots}$ slots are downlink symbols. The $\mu_{sym}$ symbols before the last $\mu_{slots}$ slots are uplink symbols. The remaining $(S-d_{slots}-\mu_{slots})\cdot N_{symb}^{slot}-d_{sym}-\mu_{sym}$ are flexible symbols.

The dynamic NR slot formats configured by DCI 2-0 are shown as in FIGS. 3A and 3B. In FIGS. 3A and 3B, the UL symbol is indicated as U, the DL symbol is indicated as D and the flexible symbol is indicated as F (the same for FIGS. 4-9). The formats index #1 and #8-15 is constructed with F and U symbols. The formats index #19-45 is constructed with D, F and U symbols with 1 switch point. The formats index #46-53 is constructed with D, F and U symbols with 2 switch points. The formats index #55 is constructed with D, U, F symbols with 1 switch pint, and ending with D. Take the slot formats #15 as an example. The last symbol of the slot formats #15 is a UL symbol and may be not available if partial TA is applied. Therefore, new slot formats or a mechanism of adjusting legacy slot formats are needed to address the cross slot boundary reception issue.

The present disclosure provides new slot formats for partial TA indication to address the existing issues for partial TA. Slot formats ending with F symbol may address the cross slot boundary reception issue due to partial TA indication. There are several options to create a slot format ending with F symbol: One option is to introduce a new slot format (hereinafter referred to Option 1); another option is to indicate a legacy slot format and a duration to shift U symbols at the end of the slot form or before D symbols (hereinafter referred to Option 2); yet another option is to indicate a legacy slot format and a duration to invalidate U symbols in such duration (hereinafter referred to Option 3). It should be note that the present disclosure is not limited to the above options. As long as slot formats can be ensure to end with an F symbol, the cross slot boundary reception issue due to partial TA indication can be solved.

For dynamic slot format, if Option 1 is adopted, new slot formats ending with an F symbol or new slot formats with F symbols before D symbols are proposed for a corresponding legacy slot format. These new slot formats can use the reserved bits in the existing table.

New slot formats 15A/B/C/D/E as shown in FIG. 4 are proposed in accordance with legacy slot format #15 ending with a U symbol. In slot format #15A, symbols #0-#4 are F, symbols #5-#12 are U and the last symbol #13 is F, i.e. "FFFFFUUUUUUUUF"; in slot format #15B, symbols #0-#3 are F, symbols #4-#11 are U and the last two symbols #12 and #13 are F, i.e. "FFFFUUUUUUUUFF"; in slot format #15C, symbols #0-#2 are F, symbols #3-#10 are U, and the last three symbols #11-#13 are F, i.e. "FFFUUUUUUUUFFF"; in slot format #15D, symbols #0-#1 are F, symbols #2-#9 are U, and the last four symbols #10-13 are F, i.e. "FFUUUUUUUUFFFF"; and in slot format #15E, symbol #0 is F, symbols #1-#8 are U, and the last five symbols #9-#13 are F, i.e. "FUUUUUUUUFFFFF".

New slot formats 52A/B/C/D as shown in FIG. 5 are proposed in accordance with legacy slot format #52 ending with U symbol. In slot format #52A, symbol #0 is D, symbols #1-#4 are F, symbol #5 is U, symbol #6 is F, symbol #7 is D, symbols #8-#11 are F, symbol #12 is U and the last symbol #13 is F, i.e. "DFFFFUFDFFFFUF"; in slot format #52B, symbol #0 is D, symbols #1-#3 are F, symbol #4 is U, symbols #5 and #6 are F, symbol #7 is D, symbols #8-#10 are F, symbol #11 is U and the last two symbols #12 and #13 are F, i.e. "DFFFUFFDFFFUFF"; in slot format #52C, symbol #0 is D, symbols #1 and #2 are F, symbol #3 is U, symbols #4-#6 are F, symbol #7 is D, symbols #8 and #9 are F, symbol #10 is U and the last three symbols #11-#13 are F, i.e. "DFFUFFFDFFUFFF"; in slot format #52D, symbol #0 is D, symbol #1 is F, symbol #2 is U, symbols #3-#6 are F, symbol #7 is D, symbol #8 is F, symbol #9 is U and the last four symbols #10-#13 are F, i.e. "DFUFFFFDFUFFFF".

For dynamic slot format, if Option 2 is adopted, a shift value N1 for adjusting the legacy slot format may be indicated. The shift value N1 may correspond to one or multiple symbols with respect to a Sub-Carrier Spacing (SCS). The SCS can be separated configured or implicitly determined by the slot format to apply the value. The shift value N1 may correspond to one or multiple slots with respect to the SCS. In some embodiments, the shift value may indicate both one or more slots and one or more symbols. A periodicity may be indicated for performing the shift. The periodicity may be separated configured by RRC signaling or implicitly determined as the monitoring periodicity of DCI 2-0. The one or more ending U symbols within the periodicity is shifted forward according to the shift value N1.

Figure 6:
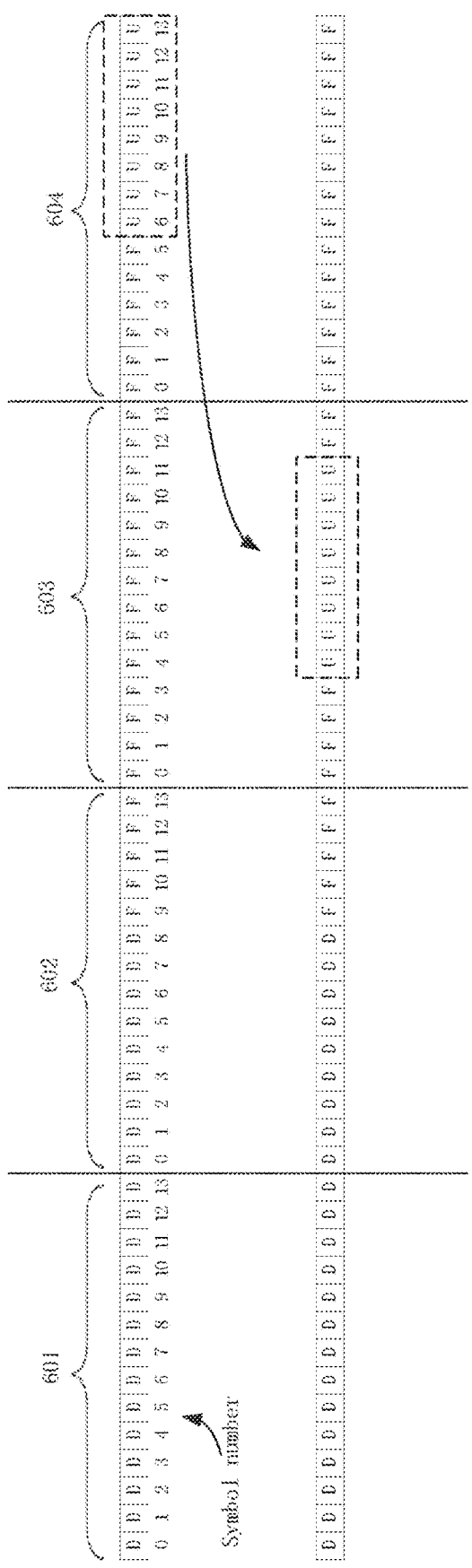
FIG. 6 illustrates an example for shifting uplink (UL) symbols in one or more slots in accordance with some embodiments of the present disclosure.

FIG. 6 illustrates an example for shifting U symbols in a periodicity of 4 slots. As shown in FIG. 6, 4 slots 601, 602, 603 and 604 are respectively configured with legacy slot format #0, #7, #2, #15, the original slot formats will be "DDDDDDDDDDDDDD/DDDDDDDDDFFFFF/ FFFFFFFFFFFFFF/FFFFFFUUU UUUUU". When the indicated shift value N1 corresponds to 1 slot and 2 symbols, the last 8 U symbols, i.e. symbols #6-#13 of slot 604, at the end the periodicity are shifted forward for 1 slot and 2 symbols, the slot/symbol index for the shifted 8 U symbols after shift will be symbols #4-#11 of slot 603. Accordingly, the slot format after shifting will be "DDDDDDDDDDDDDD/DDDDDDDDDFFFFF/FFF-FUUUUUUUUFF/FFFFFFFF FFFFFF".

The UE may not expect that after shifting, the U symbol(s) will overlap with D symbol(s) in the slots 601-604. That is, the smallest time domain index of the shifted U symbol(s) should be larger than the largest time domain index of the D symbol(s). In some embodiments, it may be required that the distance between the U symbol to be shift with the smallest time domain index and the D symbol with the largest time domain index is greater than a threshold. The threshold may indicate the minimum number of F slot/symbol(s) between the D symbol(s) and U symbol(s). The threshold may be predetermined, for example, in the specification, or configured by RRC signaling.

For dynamic slot format, if Option 3 is adopted, then a number N2 is indicated to invalidate one or more U symbols in a periodicity. The number N2 may correspond to one or multiple slots and/or one or multiple symbols In some embodiment, the number N2 may correspond to one or multiple symbol with respect to the SCS. The periodicity may be separated configured by RRC signaling or implicitly determined as the monitoring periodicity of DCI 2-0. The ending N2 U slots/symbol(s) are considered invalid. The SCS can be separately configured or determined based on the SCS of the slot format.

Figure 7:
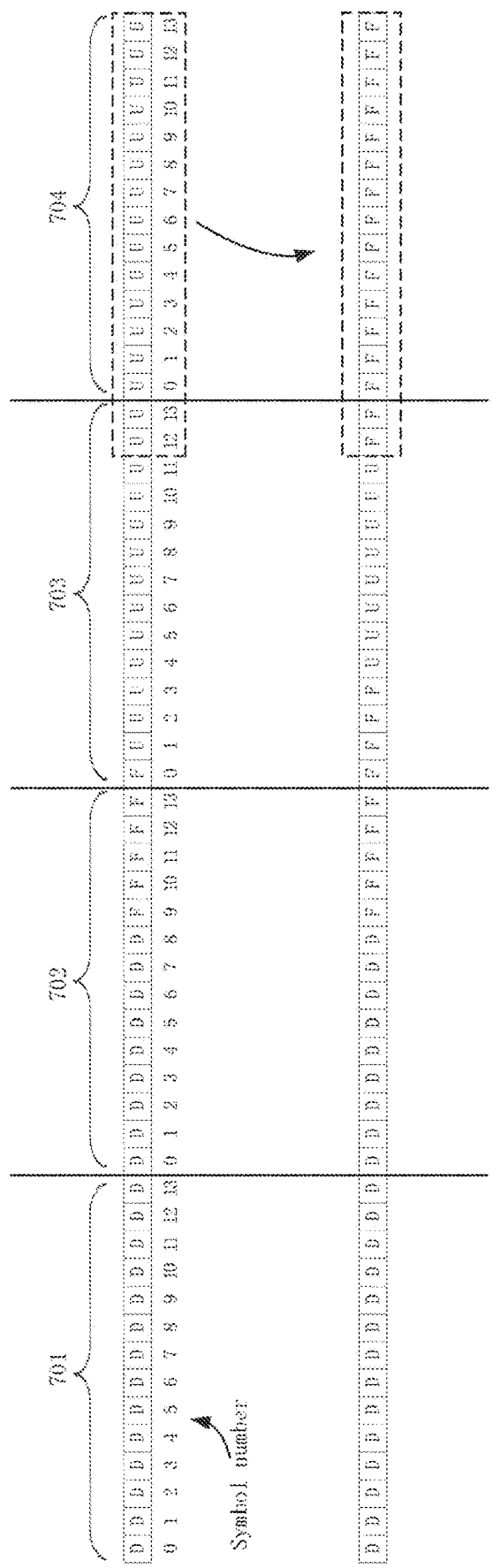
FIG. 7 illustrates an example for invalidating UL symbols in one or more slots in accordance with some embodiments of the present disclosure.

FIG. 7 illustrates an example for invalidating U symbols in a periodicity of 4 slots. As shown in FIG. 7, 4 slots 701, 702, 703 and 704 are respectively configured with slot format index #0, #7, #10, #1, the original slot formats will be "DDDDDDDDDDDDDD/DDDDDDDDDFFFFF/FUUUUUUUUUUUUU/UUUUU UUUUUUUUU". When the indicated number N2 corresponds to 1 slot and 2 symbols, e.g. 16 symbols (symbols #12 and #13 of slot 703 and symbols #0-#13 of slot 704), the last 16 U symbols at the end the periodicity will be changed to 16 F symbols. Accordingly, the slot format after validity judgement will be "DDDDDDDDDDDDDD/DDDDDDDDDFFFFF/FUUUUUUUUUUUFF/FFFFFFF FFFFFFF". That is, the ending 1 slot and 2 symbols are not used for UL transmission.

In some embodiments, for slot(s) in a periodicity, if the index of the first U symbol is smaller than the index of the first D symbol, then it may be not necessary to shift or invalidate the U symbols in the periodicity. In this case, the configured number N1 and N2 may be considered to not apply.

For semi-static slot format configured by TDD-configure-common or TDD-config-dedicated, it may be indicated in a periodical way, and may contain DL slot number and DL symbol number, UL slot number and UL symbol number. DL may start from the beginning of the periodicity and UL may end at the ending of the periodicity, flexible symbols may be used for the remaining portion in the periodicity.

For semi-static slot format, if Option 2 is adopted, the shift value N1 may be configured in a way as mentioned above. The periodicity may be deduced through the periodicity of TDD-configure-common or TDD-config-dedicated.

Figure 8:
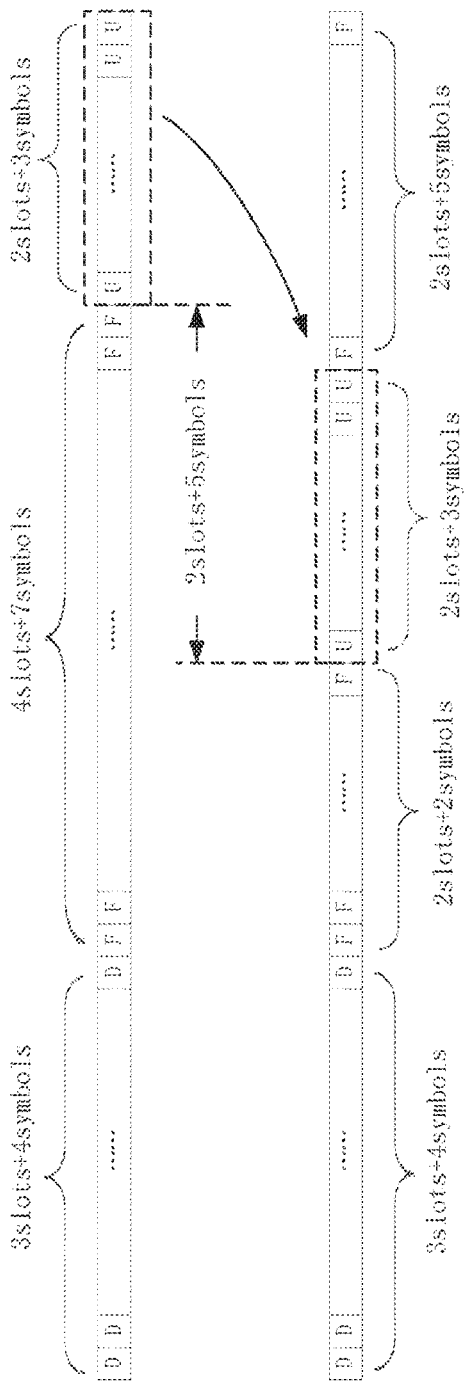
FIG. 8 illustrates an example for shifting UL symbols in one or more slots in accordance with some embodiments of the present disclosure.

FIG. 8 illustrates an example for shifting U symbols in a periodicity of 10 ms with 3 DL slots, 4 DL symbols, 2 UL slots and 3 UL symbols. Accordingly, for SCS of 15 KHz, there are 4 flexible slots and 7 flexible symbols between the D symbols and U symbols, then the format will be DL for the first 3 slots and 4 symbols, flexible for the subsequent 4 slots and 7 symbols, UL for the subsequent 2 slots and 3 symbols. If the shift value N1 corresponds to 2 slots and 5 symbols, the U symbols will be shifted forward for 2 slots and 5 symbols, then the format will be DL for the first 3 slots and 4 symbols, flexible for the subsequent 2 slots and 2 symbols, UL for the subsequent 2 slots and 3 symbols and flexible for the subsequent 2 slots and 5 symbols.

For semi-static slot format, if Option 3 is adopted, the number N2 for invalidating one or more UL symbols in the periodicity may be configured as mentioned above.

Figure 9:
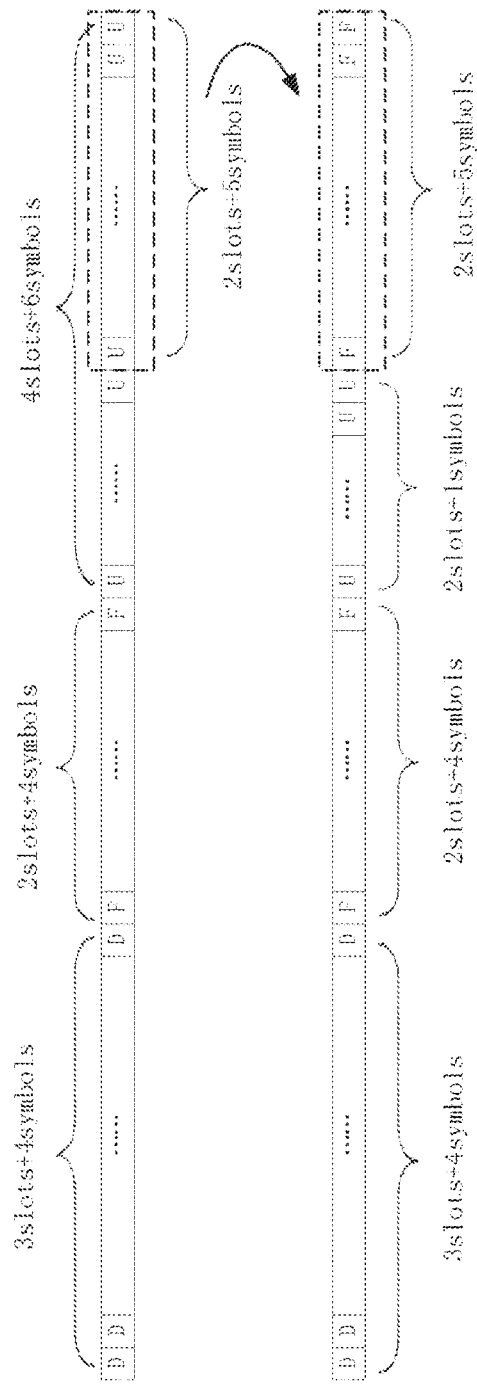
FIG. 9 illustrates an example for invalidating UL symbols in one or more slots in accordance with some embodiments of the present disclosure.

FIG. 9 illustrates an example for invalidating U symbols in a periodicity of 10 ms, with 3 DL slots, 4 DL symbols, 4 UL slots and 6 UL symbols. Accordingly, for SCS of 15 KHz, there are 2 flexible slot and 4 flexible symbols, and the format will be re will be DL for the first 3 slots and 4 symbols, flexible for the subsequent 2 slots and 4 symbols, UL for the subsequent 4 slots and 6 symbols. If the value N2 corresponds to 2 slots and 5 symbols, the last 33 U symbols at the end of the periodicity are replaced by F symbols, and the format will be DL for the first 3 slots and 4 symbols, flexible for the subsequent 2 slots and 4 symbols, UL for the subsequent 2 slots and 1 symbols and flexible for the subsequent 2 slots and 5 symbols.

Figure 10:
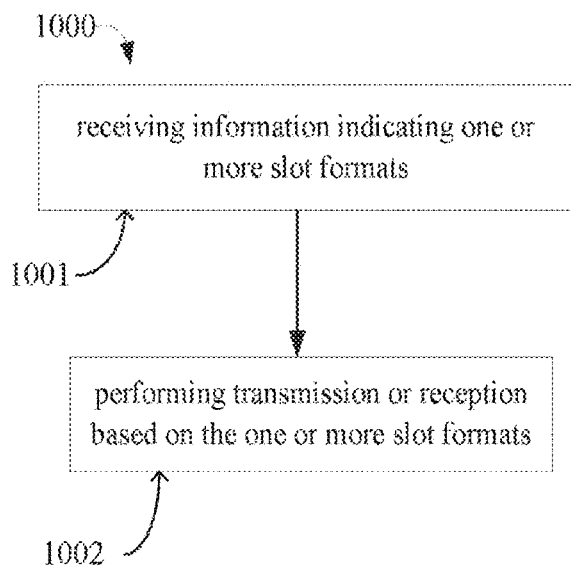
FIG. 10 illustrates a flow chart of a method in accordance with some embodiments of the present disclosure.

FIG. 10 illustrates a flow chart of a method in accordance with some embodiments of the present disclosure. The exemplary method 1000 as illustrated and shown in FIG. 10 is performed by a UE.

In the exemplary method 1000, in operation 1001, the UE (e.g., UE 101*a* as illustrated and shown in FIG. 1) receives information indicating one or more slot formats, wherein each slot format comprises a plurality of symbols each indicated as a downlink symbol, a uplink symbol or a flexible symbol.

In operation 1002, the UE performs transmission or reception based on the one or more slot formats.

In some embodiments, the information may comprise a first value, and the first value may comprise a number in unit of slots and/or symbols or a number in unit of microsecond.

In some embodiments, the first value may be configured by Radio Resource Control (RRC), Medium Access Control Control Element (MAC CE) or group common Downlink Control Information (DCI).

In some embodiments, wherein the information indicates shifting one or more continuous uplink symbols at the ending of the one or more slot format or before downlink symbols before performing the transmission or the reception.

In some embodiments, the shifting may be performed by decreasing a time domain index of each of the one or more continuous uplink symbols with a first number.

In some embodiments, the information may further indicate a second value, wherein a difference between a smallest time domain index of the shifted one or more continuous uplink symbols and a largest time domain index of one or more downlink symbols is greater than the second value.

In some embodiments, the second value may be configured by Radio Resource Control (RRC), or predefined.

In some embodiments, the information may indicate invalidating a first number of continuous uplink symbols at the ending of the one or more slot format or before downlink symbols before performing the transmission or the reception.

In some embodiments, the invalidating may be performed by replacing the first number of continuous uplink symbols with the first number of flexible symbols.

In some embodiments, a duration of the one or more slot formats may be configured by RRC signalling or is predefined.

In some embodiments, a duration of the one or more slot formats may be the same as periodicity of semi-static common or UE specific Time Division Duplexing (TDD) configuration.

In some embodiments, a duration of the one or more slot formats may be the same as DCI 2-0 monitoring periodicity.

In some embodiments, a duration of the one or more slot formats may be the same as the number of slots indicated by a DCI 2-0.

In some embodiments, the information may further comprise a second value, wherein the smallest uplink symbol index after shifting the number of uplink symbols is larger than the largest downlink symbol index plus the second value.

In some embodiments, the second value may be configured by RRC signalling or is predefined.

In some embodiments, the information may indicate that the one or more slot formats are consist of at least one flexible symbol, followed by at least one uplink symbol, and followed by at least one flexible symbol.

In some embodiments, the information may indicate that the one or more slot formats are consist of at least one downlink symbol, followed by at least one flexible symbol, followed by at least one uplink symbol, followed by at least one flexible symbol, followed by at least one downlink symbol, followed by at least one flexible symbol, followed by at least one uplink symbol, and followed by at least one flexible symbol.

In some embodiments, the slot format may be configured by at least one of RRC, MAC CE and DCI signalling.

Figure 11:
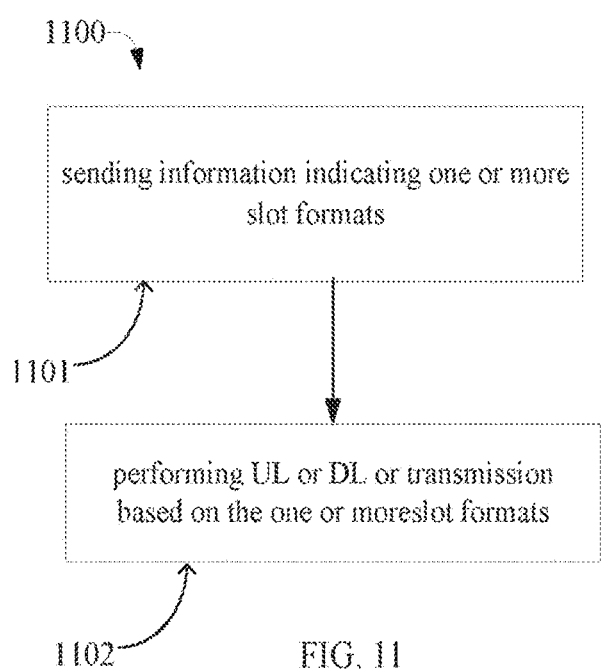
FIG. 11 illustrates a flow chart of a method in accordance with some embodiments of the present disclosure.

FIG. 11 illustrates a flow chart of a method with some embodiments of the present disclosure. The exemplary method 900 as illustrated and shown in FIG. 11 is performed by a BS (for example, a BS attached to the satellite 102a).

In the exemplary method 1100, in operation 1101, the BS sends information indicating one or more slot formats.

In operation 1102, the BS performs UL or DL transmission based on the one or more slot formats.

In some embodiments, the information may comprise a first value, wherein the first value is a number in unit of slots and/or symbols or a number in unit of microsecond.

In some embodiments, the first value may be configured by Radio Resource Control (RRC), Medium Access Control Control Element (MAC CE) or group common Downlink Control Information (DCI).

In some embodiments, the information may indicates shifting one or more continuous uplink symbols at the ending of the one or more slot format before performing the transmission or the reception.

In some embodiments, the information may indicate that shifting is performed by decreasing a time domain index of each of the one or more continuous uplink symbols with a first number.

In some embodiments, the information may further indicate a second value, wherein a difference between a smallest time domain index of the shifted one or more continuous uplink symbols and a largest time domain index of one or more downlink symbols is greater than the second value.

In some embodiments, the second value may be configured by Radio Resource Control (RRC), or predefined.

In some embodiments, the information may indicate invalidating a first number of continuous uplink symbols at the ending of the one or more slot format before performing the transmission or the reception.

In some embodiments, the information may indicate that invalidating is performed by replacing the first number of continuous uplink symbols with the first number of flexible symbols.

In some embodiments, a duration of the one or more slot formats may be configured by RRC signalling or is predefined.

In some embodiments, a duration of the one or more slot formats may be the same as periodicity of semi-static common or UE specific Time Division Duplexing (TDD) configuration.

In some embodiments, a duration of the one or more slot formats may be the same as DCI 2-0 monitoring periodicity.

In some embodiments, a duration of the one or more slot formats may be the same as the number of slots indicated by a DCI 2-0.

In some embodiments, the information may further comprise a second value, wherein the smallest uplink symbol index after shifting the number of uplink symbols is larger than the largest downlink symbol index plus the second value.

In some embodiments, the second value may be configured by RRC signalling or is predefined.

In some embodiments, the information may indicate that the one or more slot formats are consist of at least one flexible symbol, followed by at least one uplink symbol, and followed by at least one flexible symbol in sequence.

In some embodiments, the information may indicates that the one or more slot formats are consist of at least one downlink symbol, followed by at least one flexible symbol, followed by at least one uplink symbol, followed by at least one flexible symbol, followed by at least one downlink symbol, followed by at least one flexible symbol, followed by at least one uplink symbol, and followed by at least one flexible symbol.

In some embodiments, the slot format may be configured by RRC, MAC CE or DCI signalling.

Figure 12:
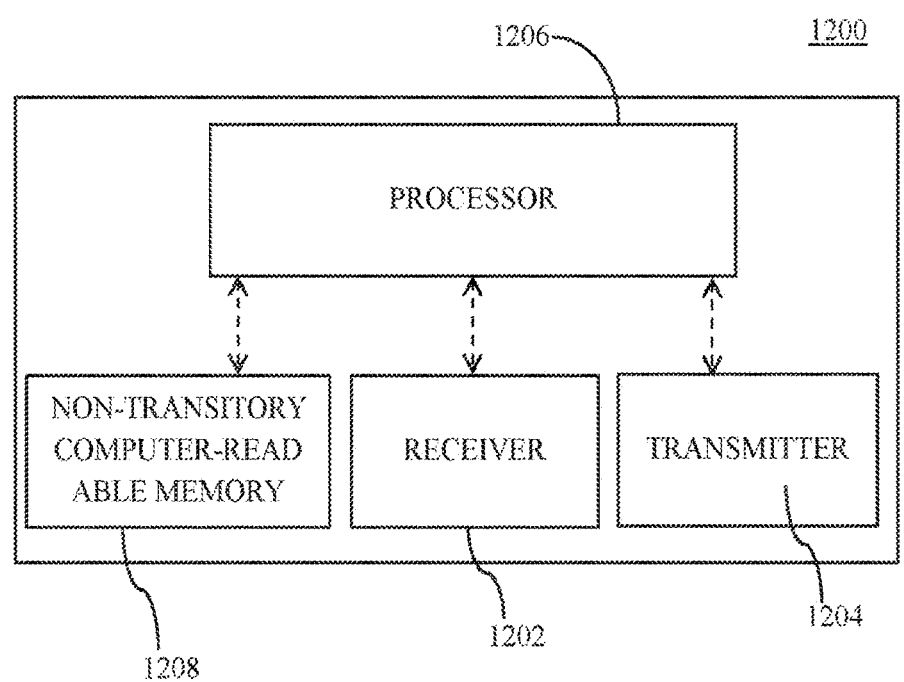
FIG. 12 illustrates a block diagram of an exemplary apparatus in accordance with some embodiments of the present disclosure.

FIG. 12 illustrates a block diagram of an exemplary apparatus in accordance with some embodiments of the present disclosure. Referring to FIG. 10, the apparatus 1000 includes a receiving circuitry 1002, a transmitting circuitry 1004, a processor 1006, and a non-transitory computer-readable medium 1008. The processor 1006 is coupled to the non-transitory computer-readable medium 1008, the receiving circuitry 1002, and the transmitting circuitry 1004.

It is contemplated that some components are omitted in FIG. 10 for simplicity. In some embodiments, the receiving circuitry 1002 and the transmitting circuitry 1004 may be integrated into a single component (e.g., a transceiver).

In some embodiments, the non-transitory computer-readable medium 1008 may have stored thereon computer-executable instructions to cause a processor to implement the operations performed by UE(s) or BS(s) as described above.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present disclosure.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method performed by a user equipment (UE), the method comprising:
    receiving information comprising a plurality of symbols each indicated as a downlink symbol, an uplink symbol or a flexible symbol,
    wherein the information indicates shifting one or more continuous uplink symbols at an ending of one or more slot formats or before downlink symbols for a duration, or the information indicates invalidating a first number of continuous uplink symbols at the ending of the one or more slot formats or before downlink symbols for a duration; and
    performing transmission or reception based on the received information.

2. A user equipment (UE) for wireless communication, comprising:
    at least one memory; and
    at least one processor coupled with the at least one memory and operable to cause the UE to:
        receive information comprising a plurality of symbols each indicated as a downlink symbol, an uplink symbol or a flexible symbol,
        wherein the information indicates shifting one or more continuous uplink symbols at an ending of one or more slot formats or before downlink symbols for a duration, or the information indicates invalidating a first number of continuous uplink symbols at the ending of the one or more slot formats or before downlink symbols for a duration; and
        performing transmission or reception based on the received information.

3. A base station for wireless communication, comprising:
    at least one memory; and
    at least one processor coupled with the at least one memory and operable to cause the base station to:
        send information comprising a plurality of symbols each indicated as a downlink symbol, an uplink symbol or a flexible symbol,
        wherein the information indicates shifting one or more continuous uplink symbols at an ending of one or more slot formats before performing transmission or reception, or the information indicates invalidating a first number of continuous uplink symbols at the ending of the one or more slot formats before performing the transmission or the reception based on the information.

4. The UE of claim 2, wherein the information is configured by Radio Resource Control (RRC), Medium Access Control Control Element (MAC CE) or group common Downlink Control Information (DCI).

5. The UE of claim 2, wherein the at least one processor is further operable to cause the UE to shift the one or more continuous uplink symbols by decreasing a time domain index of each of the one or more continuous uplink symbols with a first number.

6. The UE of claim 2, wherein the information further indicates a second value, wherein a difference between a smallest time domain index of the shifted one or more continuous uplink symbols and a largest time domain index of one or more downlink symbols is greater than the second value.

7. The UE of claim 6, wherein the second value is configured by Radio Resource Control (RRC), or predefined.

8. The UE of claim 2, wherein the at least one processor is further operable to cause the UE to invalidate the first number of continuous uplink symbols by replacing the first number of continuous uplink symbols with a first number of flexible symbols.

9. The UE of claim 2, wherein the duration of the one or more slot formats is configured by RRC signalling or is predefined.

10. The UE of claim 2, wherein the duration of the one or more slot formats is periodicity of semi-static common or a user equipment (UE) specific Time Division Duplexing (TDD) configuration.

11. The UE of claim 2, wherein the duration of the one or more slot formats is a Downlink Control Information (DCI) 2-0 monitoring periodicity.

12. The UE of claim 2, wherein a duration of the one or more slot formats is a number of slots indicated by a Downlink Control Information (DCI) 2-0.

13. The UE of claim 2, wherein the information further comprises a second value, wherein a smallest uplink symbol index after shifting a number of uplink symbols is larger than a largest downlink symbol index plus the second value.

14. The UE of claim 13, wherein the second value is configured by Radio Resource Control (RRC) signalling or is predefined.

15. The UE of claim 2, wherein the information indicates that the one or more slot formats consist of at least one flexible symbol, followed by at least one uplink symbol, and followed by at least one flexible symbol.

16. The UE of claim 15, wherein the one or more slot formats are configured by at least one of Radio Resource Control (RRC), Medium Access Control Control Element (MAC CE) and Downlink Control Information (DCI) signalling.

17. The UE of claim 2, wherein the information indicates that the one or more slot formats consist of at least one downlink symbol, followed by at least one flexible symbol, followed by at least one uplink symbol, followed by at least one flexible symbol, followed by at least one downlink symbol, followed by at least one flexible symbol, followed by at least one uplink symbol, and followed by at least one flexible symbol.

18. The UE of claim 17, wherein the one or more slot formats are configured by at least one of Radio Resource Control (RRC), Medium Access Control Control Element (MAC CE) and Downlink Control Information (DCI) signalling.

19. A method performed by a base station, the method comprising:
   sending information comprising a plurality of symbols each indicated as a downlink symbol, an uplink symbol or a flexible symbol,
   wherein the information indicates shifting one or more continuous uplink symbols at an ending of one or more slot formats before performing transmission or reception, or the information indicates invalidating a first number of continuous uplink symbols at the ending of the one or more slot formats before performing the transmission or the reception based on the information.

20. The base station of claim 3, wherein the information is configured by Radio Resource Control (RRC), Medium Access Control Control Element (MAC CE) or group common Downlink Control Information (DCI).

21. The base station of claim 3, wherein the at least one processor is further operable to cause the base station to shift the one or more continuous uplink symbols by decreasing a time domain index of each of the one or more continuous uplink symbols with a first number.

* * * * *